(12) United States Patent
Kato

(10) Patent No.: US 11,368,239 B2
(45) Date of Patent: Jun. 21, 2022

(54) WAVELENGTH CONVERSION DEVICE AND WAVELENGTH CONVERSION METHOD

(71) Applicant: FUJITSU LIMITED, Kawasaki (JP)

(72) Inventor: Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/371,173

(22) Filed: Jul. 9, 2021

(65) Prior Publication Data
US 2022/0077949 A1 Mar. 10, 2022

(30) Foreign Application Priority Data
Sep. 4, 2020 (JP) .............................. JP2020-149189

(51) Int. Cl.
*H04J 14/02* (2006.01)
*G02F 1/35* (2006.01)
(Continued)

(52) U.S. Cl.
CPC ........ *H04J 14/0221* (2013.01); *G02F 1/3536* (2013.01); *G02F 1/365* (2013.01); *H04B 10/564* (2013.01); *H04B 10/572* (2013.01)

(58) Field of Classification Search
CPC .... H04J 14/02; H04J 14/0221; H04J 14/0213; H04B 10/675; H04B 10/572;
(Continued)

(56) References Cited

U.S. PATENT DOCUMENTS

| 2004/0136053 A1 | 7/2004 | Sugiya |
| 2004/0252999 A1 | 12/2004 | Onaka et al. |

(Continued)

FOREIGN PATENT DOCUMENTS

| EP | 1596511 | 11/2005 |
| JP | 2001-007768 A | 1/2001 |

(Continued)

OTHER PUBLICATIONS

Extended European Search Report (EESR) of corresponding European Patent Application No. 21184247.1 dated Jan. 5, 2022, 5 pages.

*Primary Examiner* — Hibret A Woldekidan
(74) *Attorney, Agent, or Firm* — Fujitsu Patent Center

(57) ABSTRACT

A wavelength conversion device includes a wavelength converter converts a wavelength band of a wavelength-division multiplex signal, a first wavelength filter transmits the wavelength-division multiplex signal on an input side of the wavelength converter, a second wavelength filter transmits the wavelength-division multiplex signal on an output side of the wavelength converter, and a controller controls a temperature of the wavelength converter such that a difference between a ratio of power of the wavelength-division multiplex signal which is not transmitted through the first wavelength filter on the input side to power of the wavelength-division multiplex signal which have been transmitted through the first wavelength filter on the input side and a ratio of a power of the wavelength-division multiplex signal which is not transmitted through the second wavelength filter on the output side to power of the wavelength-division multiplex signal which have been transmitted through the second wavelength filter.

8 Claims, 12 Drawing Sheets

(51) Int. Cl.
  *G02F 1/365* (2006.01)
  *H04B 10/564* (2013.01)
  *H04B 10/572* (2013.01)
(58) Field of Classification Search
  CPC .......... H04B 10/564; H04Q 2011/0011; H04Q 2011/0016; H04Q 2011/0015; G02F 1/3536; G02F 1/365
  USPC ............................ 398/79, 82, 85, 93, 94, 95
  See application file for complete search history.

(56) References Cited

U.S. PATENT DOCUMENTS

| | | | |
|---|---|---|---|
| 2009/0269079 A1* | 10/2009 | Izumi .................... | H04J 14/086 398/147 |
| 2015/0071641 A1* | 3/2015 | Wen ........................ | H04J 14/02 398/193 |
| 2019/0349113 A1* | 11/2019 | Komiya .............. | H04J 14/0275 |
| 2021/0405502 A1* | 12/2021 | Umeki .................. | G02F 1/3558 |

FOREIGN PATENT DOCUMENTS

| | | |
|---|---|---|
| JP | 2003-188830 A | 7/2003 |
| JP | 2004-158652 A | 6/2004 |
| WO | 2020/095754 | 5/2020 |

\* cited by examiner

WAVELENGTH CONVERSION DEVICE AND WAVELENGTH CONVERSION METHOD

CROSS-REFERENCE TO RELATED APPLICATION

This application is based upon and claims the benefit of priority of the prior Japanese Patent Application No. 2020-149189, filed on Sep. 4, 2020, the entire contents of which are incorporated herein by reference.

FIELD

The embodiments discussed herein are related to a wavelength conversion device and a wavelength conversion method.

BACKGROUND

With the increase in a communication demand, increasing a transmission capacity of wavelength division multiplexing (WDM) by increasing channels of optical signals to be wavelength-multiplexed has been in demand. For example, in the case of performing transmission using only wavelength-division multiplex optical signals of a conventional (C) band, its wavelength band is limited to 1530 to 1565 (nm).

Meanwhile, for example, it is possible to increase the transmission capacity of WDM by extending the wavelength band to a long (L) band of 1565 to 1625 (nm) and a short (S) band of 1460 to 1530 (nm). There is disclosed a technique of multiplexing and transmitting respective wavelength-division multiplex optical signals of the C-band, L-band, and S-band by converting wavelength-division multiplex optical signals of the C-band into wavelength-division multiplex optical signals of the L-band and S-band.

Japanese Laid-open Patent Publication No, 2003-188830 is disclosed as related art.

SUMMARY

According to an aspect of the embodiments, a wavelength conversion device includes: a wavelength converter configured to convert a wavelength band of a wavelength-division multiplex optical signal in which a plurality of optical signals is wavelength-multiplexed; a first wavelength filter configured to transmit the wavelength-division multiplex optical signal on an input side of the wavelength converter such that power distribution with respect to a wavelength of the plurality of optical signals is biased; a second wavelength filter configured to transmit the wavelength-division multiplex optical signal on an output side of the wavelength converter such that the power distribution with respect to the wavelength of the plurality of optical signals is biased; a first detector configured to detect first power of the wavelength-division multiplex optical signal which have been transmitted through the first wavelength filter on the input side of the wavelength converter; a second detector configured to detect second power of the wavelength-division multiplex optical signal which is not transmitted through the first wavelength filter on the input side of the wavelength converter; a third detector configured to detect third power of the wavelength-division multiplex optical signal which have been transmitted through the second wavelength filter on the output side of the wavelength converter; a fourth detector configured to detect fourth power of the wavelength-division multiplex optical signal which is not transmitted through the second wavelength filter on the output side of the wavelength converter; and a controller configured to control a temperature of the wavelength converter such that a difference between a first ratio of the second power to the first power and a second ratio of the fourth power to the third power decreases.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Wavelength conversion characteristics of a wavelength converter that converts a wavelength band of a wavelength-division multiplex optical signal change due to deviation from an ideal state caused by a temperature change of a non-linear optical medium, for example. Accordingly, there is a possibility that distribution of output power with respect to the wavelength of the optical signal in the wavelength-division multiplex optical signal after wavelength conversion is biased. When the distribution of the output power is biased, the transmission characteristics of the wavelength-division multiplex optical signal are biased for each wavelength, and a transmittable distance is shortened.

In view of the above, it is an object of the present case to provide a wavelength conversion device and a wavelength conversion method capable of suppressing a bias in distribution of output power due to wavelength conversion of a wavelength-division multiplex optical signal.

(Exemplary Configuration of Transmission System)

Figure 1:
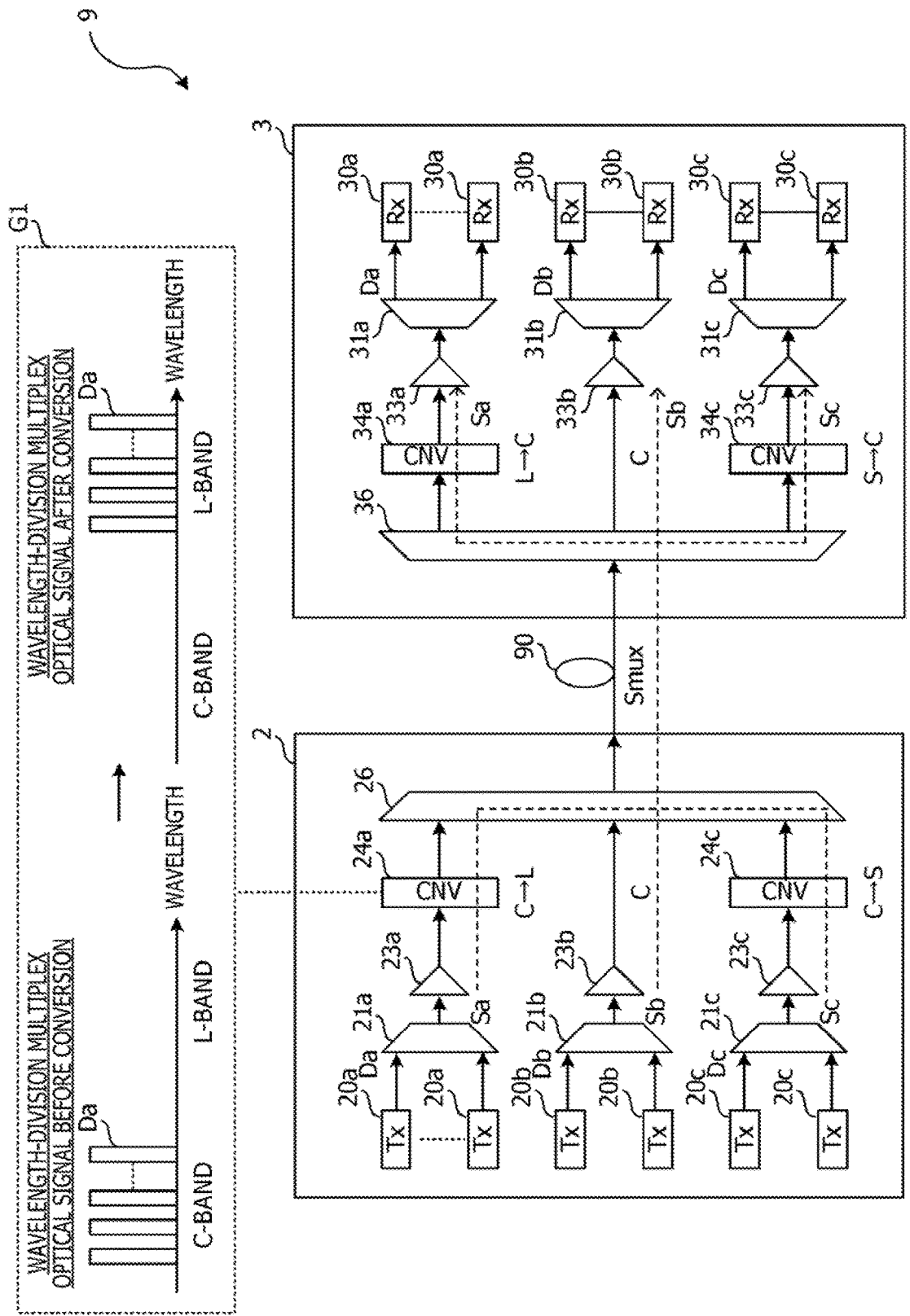
FIG. 1 is a configuration diagram illustrating an exemplary transmission system.

FIG. 1 is a configuration diagram illustrating an example of a transmission system 9. As an example, the transmission system 9 includes a transmission line 90 composed of an optical fiber or the like, and a transmission device 2 and a reception device 3 connected to each other via the transmission line 90.

As indicated by the dotted line, the transmission device 2 multiplexes each of wavelength-division multiplex optical signals Sa to Sc of a C-band, L-band, and S-band to generate multiplexed light Smux, and transmits it to the reception device 3 via the transmission line 90. The transmission device 2 includes a plurality of transmitters (Tx) 20a to 20c, multiplexers 21a to 21c, optical amplifiers 23a to 23c, wavelength conversion devices (CNV) 24a and 24c, and a multiplexer 26.

The wavelength conversion device 24a converts the wavelength band of the wavelength-division multiplex optical signal Sa from the C-band to the L-band, and the wavelength conversion device 24c converts the wavelength band of the wavelength-division multiplex optical signal Sc from the C-band to the S-band. Note that the configurations of the wavelength conversion devices 24 and 24c will be described later.

The plurality of transmitters 20a, the multiplexer 21a, the optical amplifier 23a, and the wavelength conversion device 24a are provided on the path of the wavelength-division multiplex optical signal Sa. Each of the transmitters 20a generates an optical signal Da having a wavelength in the C-band, and outputs it to the multiplexer 21a. The wavelength of the optical signal Da of each transmitter 20a is different.

The plurality of transmitters 20b, the multiplexer 21b, and the optical amplifier 23b are provided on the path of the wavelength-division multiplex optical signal Sb. Each of the transmitters 20b generates an optical signal Db having a wavelength in the C-band, and outputs it to the multiplexer 21b. The wavelength of the optical signal Db of each transmitter 20b is different.

The plurality of transmitters 20c, the multiplexer 21c, and the optical amplifier 23c are provided on the path of the wavelength-division multiplex optical signal Sc. Each of the transmitters 20c generates an optical signal Dc having a wavelength in the C-band, and outputs it to the multiplexer 21c. The wavelength of the optical signal Dc of each transmitter 20c is different.

The transmitters 20a to 20c are connected to a local area network (LAN) or the like on the client side. The transmitters 20a to 20c generate optical signals Da to Dc, respectively, from client signals such as Ethernet (registered trademark, the same applies hereinafter) signals, for example.

The multiplexer 21a multiplexes the optical signal Da input from each transmitter 20a to generate a wavelength-division multiplex optical signal Sa of the C-band, and outputs it to the optical amplifier 23a. Furthermore, in a similar manner to the multiplexer 21a, the multiplexer 21b generates a wavelength-division multiplex optical signal Sb of the C-band from each optical signal Db to output it to the optical amplifier 23b, and the multiplexer 21c generates a wavelength-division multiplex optical signal Sc of the C-band from each optical signal Dc to output it to the optical amplifier 23c. Note that the multiplexers 21a to 21c are optical couplers, for example.

The optical amplifiers 23a to 23c amplify the wavelength-division multiplex optical signals Sa to Sc, respectively. The optical amplifiers 23a to 23c are erbium-doped optical fiber amplifiers (EDFAs), for example. The optical amplifier 23a outputs the wavelength-division multiplex optical signal Sa to the wavelength conversion device 24a. The optical amplifier 23b outputs the wavelength-division multiplex optical signal Sb to the multiplexer 26. The optical amplifier 23c outputs the wavelength-division multiplex optical signal Sc to the wavelength conversion device 24c.

As indicated by the reference sign G1, the wavelength conversion device 24a converts the wavelength band of the wavelength-division multiplex optical signal Sa from the C-band to the L-band. Accordingly, the wavelength of each optical signal Da having been subject to wavelength multiplexing with the wavelength-division multiplex optical signal Sa is converted from the C-band to the L-band. Furthermore, the wavelength conversion device 24c converts the wavelength band of the wavelength-division multiplex optical signal Sc from the C-band to the S-band. Accordingly, the wavelength of each optical signal Dc having been subject to wavelength multiplexing with the wavelength-division multiplex optical signal Sc is converted from the C-band to the S-band. The wavelength conversion devices 24a and 24c output, to the multiplexer 26, the converted wavelength-division multiplex optical signals Sa and Sc, respectively.

The multiplexer 26 multiplexes the wavelength-division multiplex optical signals Sa and Sc input from the wavelength conversion devices 24a and 24c, respectively, and the wavelength-division multiplex optical signal Sb input from the optical amplifier 23b, and outputs the multiplexed light Smux to the transmission line 90. Note that the multiplexer 26 is an optical coupler, for example.

In this manner, the transmission device 2 multiplexes the wavelength-division multiplex optical signal Sa of the L-band, the wavelength-division multiplex optical signal Sb of the C-band, and the wavelength-division multiplex optical signal Sc of the S-band, in which the optical signals Da to Dc have been subject to wavelength-multiplexing, respectively, and transmits the multiplexed light Smux to the reception device 3.

The reception device 3 includes a plurality of receivers (Rx) 30a to 30c, demultiplexers 31a to 31c, optical amplifiers 33a to 33c, wavelength conversion devices (CNV) 34a and 34c, and a demultiplexer 36. The multiplexed light Smux is input from the transmission line 90 to the demultiplexer 36.

The demultiplexer 36 demultiplexes the multiplexed light Smux for each wavelength band, and outputs it from different ports. The demultiplexer 36 is an optical splitter, for example.

The wavelength-division multiplex optical signal Sa of the L-band is input to the wavelength conversion device 34a. The wavelength conversion device 34a converts the wavelength band of the wavelength-division multiplex optical signal Sa from the L-band to the C-band, and outputs it to the optical amplifier 33a. The optical amplifier 33a amplifies the wavelength-division multiplex optical signal Sa, and outputs it to the demultiplexer 31a.

The wavelength-division multiplex optical signal Sc of the S-band is input to the wavelength conversion device 34c. The wavelength conversion device 34c converts the wavelength band of the wavelength-division multiplex optical signal Sc from the S-band to the C-band, and outputs it to the optical amplifier 33c. The optical amplifier 33c amplifies the wavelength-division multiplex optical signal Sc, and outputs it to the demultiplexer 31c. Note that the configurations of the wavelength conversion devices 34a and 34c will be described later.

The wavelength-division multiplex optical signal Sb of the C-band is input from the demultiplexer 36 to the optical amplifier 33b. The optical amplifier 33b amplifies the wavelength-division multiplex optical signal Sb, and outputs it to the demultiplexer 31b.

The demultiplexer 31a demultiplexes the wavelength-division multiplex optical signal Sa into an optical signal Da for each wavelength, and outputs it to the receiver 30a. The demultiplexer 31b demultiplexes the wavelength-division multiplex optical signal Sb into an optical signal Db for each wavelength, and outputs it to the receiver 30b. The demultiplexer 31c demultiplexes the wavelength-division multiplex optical signal Sc into an optical signal Dc for each wavelength, and outputs it to the receiver 30c. Note that the demultiplexers 31a to 31c are optical splitters, for example.

The receivers 30a to 30c receive the optical signals Da to Dc, respectively. The receivers 30a to 30c are connected to a LAN or the like on the client side, generate client signals from the optical signals Da to Dc, for example, and transmit them to the LAN.

In this manner, the reception device 3 receives the multiplexed light Smux, and demultiplexes the multiplexed light Smux into the wavelength-division multiplex optical signal Sa of the L-band, the wavelength-division multiplex optical signal Sb of the C-band, and the wavelength-division multiplex optical signal Sc of the S-band.

First Embodiment

Figure 2:
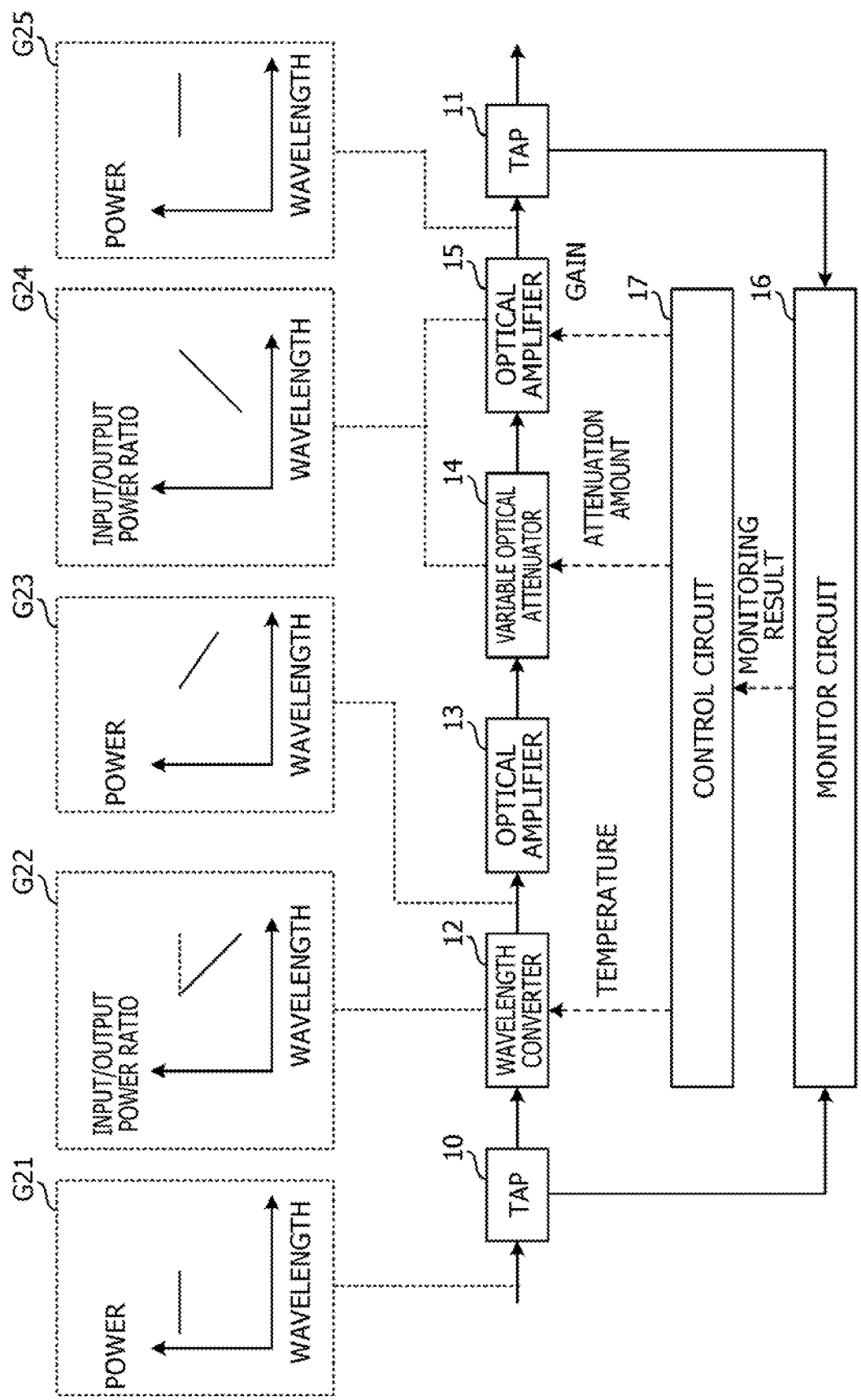
FIG. 2 is a configuration diagram illustrating a wavelength conversion device according to a first embodiment.

FIG. 2 is a configuration diagram illustrating wavelength conversion devices 24a, 24c, 34a, and 34c according to a first embodiment. The wavelength conversion devices 24a, 24c, 34a, and 34c include taps 10 and 11, a wavelength converter 12, optical amplifiers 13 and 15, a variable optical attenuator 14, a monitor circuit 16, and a control circuit 17. Note that, while operation of the wavelength conversion device 24a provided in a transmission device 2 will be exemplified in the following descriptions, operation of the other wavelength conversion devices 24c, 34a, and 34c is also similar to that of the wavelength conversion device 24a.

The tap 10 branches a wavelength-division multiplex optical signal Sa on the input side of the wavelength converter 12 toward the wavelength converter 12 and the monitor circuit 16. The tap 10 includes an optical splitter, for example. The tap 10 is an example of a second branch portion that branches the wavelength-division multiplex optical signal Sa on the input side of the wavelength converter 12 to the monitor circuit 16.

The wavelength converter 12 converts the wavelength band of the wavelength-division multiplex optical signal Sa from a C-band to an L-band.

Figure 3:
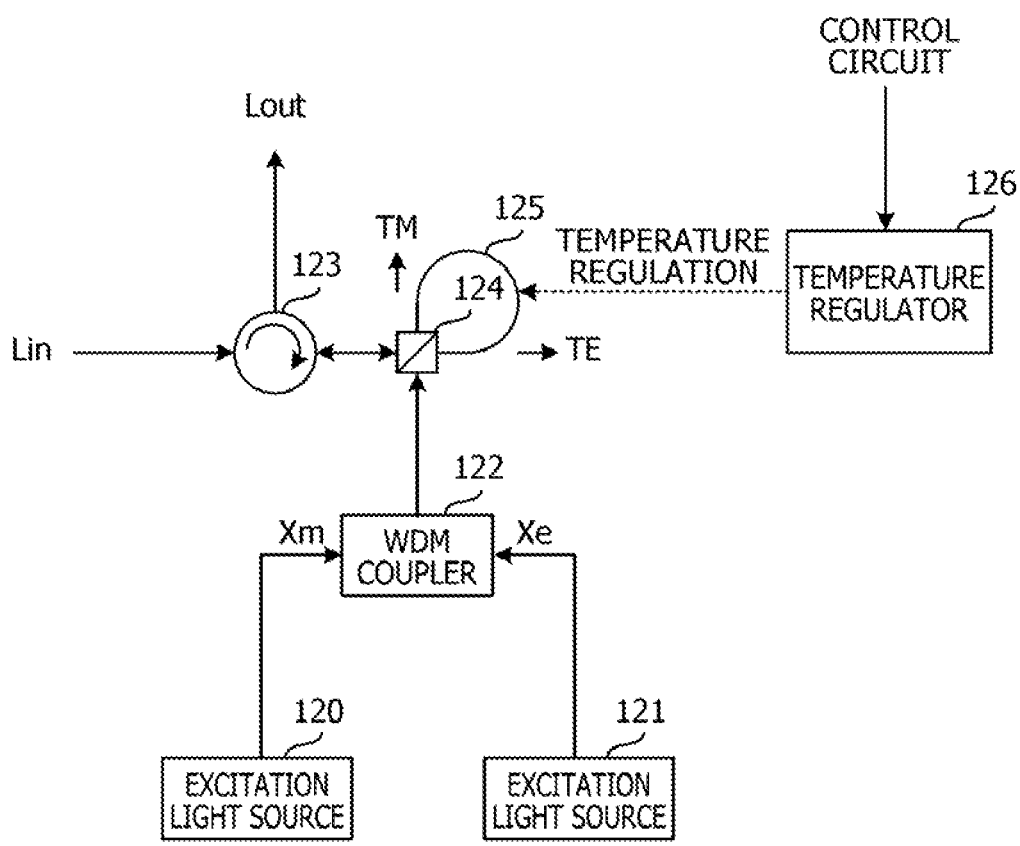
FIG. 3 is a configuration diagram illustrating an exemplary wavelength converter.

FIG. 3 is a configuration diagram illustrating an example of the wavelength converter 12. Each wavelength converter 12 includes a wavelength division multiplexing (WDM) coupler 122, excitation light sources 120 and 121, an optical circulator 123, a polarization beam splitter 124, a highly non-linear fiber (HNLF) 125, and a temperature regulator 126.

Here, the wavelength-division multiplex optical signals Sa and Sc to be input to the wavelength conversion devices 24a, 24c, 34a, and 34c will be referred to as input light Lin. Furthermore, the wavelength-division multiplex optical signals Sa and Sc to be output from the wavelength conversion devices 24a, 24c, 34a, and 34c will be referred to as output light Lout.

The excitation light sources 120 and 121 output, to the WDM coupler 122, excitation light Xm and Xe, respectively. The polarizations of the respective excitation light Xm and Xe are orthogonal to each other. The WDM coupler 122 performs wavelength multiplexing on the two excitation light Xm and Xe, and outputs them to the polarization beam splitter 124. Furthermore, the input light Lin is input to the polarization beam splitter 124 through the optical circulator 123.

Both ends of the highly non-linear fiber 125 are connected to the polarization beam splitter 124. The highly non-linear fiber 125 is a non-linear optical medium, which has two main axes. A TE polarization output port of the polarization beam splitter 124 is connected to one end of the highly non-linear fiber 125 at an angle corresponding to one main axis. A TM polarization output port of the polarization beam splitter 124 is connected to the other end of the highly non-linear fiber 125 at the angle corresponding to the same main axis.

The excitation light Xm and Xe and the input light Lin are split into TE polarization and TM polarization by the polarization beam splitter 124, and the TE polarization and the TM polarization are input to separate ends of the highly non-linear fiber 125, and input to the polarization beam splitter 124 again from the other end.

The highly non-linear fiber 125 occurs four-wave mixing (FWM) of the excitation light Xm and Xe and the input light Lin. The idler light generated by the four-wave mixing has a wavelength corresponding to the difference between the respective wavelengths of the excitation light Xm and Xe and the input light Lin. The idler light is input from the highly non-linear fiber 125 to the optical circulator 123 through the polarization beam splitter 124. The idler light is output from the optical circulator 123 as the output light Lout.

The temperature regulator 126 is a heater, a fan, or the like, for example, and regulates the temperature of the highly non-linear fiber 125 as an example. The characteristics of the wavelength conversion of the wavelength converter 12 change according to the temperature of the highly non-linear fiber 125. Therefore, the distribution of the output power with respect to the wavelength generated by the wavelength conversion of the wavelength-division multiplex optical signal is biased. Meanwhile, the temperature regulator 126 regulates the temperature under the control of the control circuit 17 as described later so that the change in the characteristics of the wavelength conversion of the wavelength converter 12 is suppressed, whereby the bias of the distribution of the output power is suppressed.

According to the wavelength converter 12 of the present example, the wavelength band of the wavelength-division multiplex optical signal Sa is converted from the C-band to the L-band according to a wavelength conversion scheme based on non-degenerate four-wave mixing, as described below.

Figure 4:
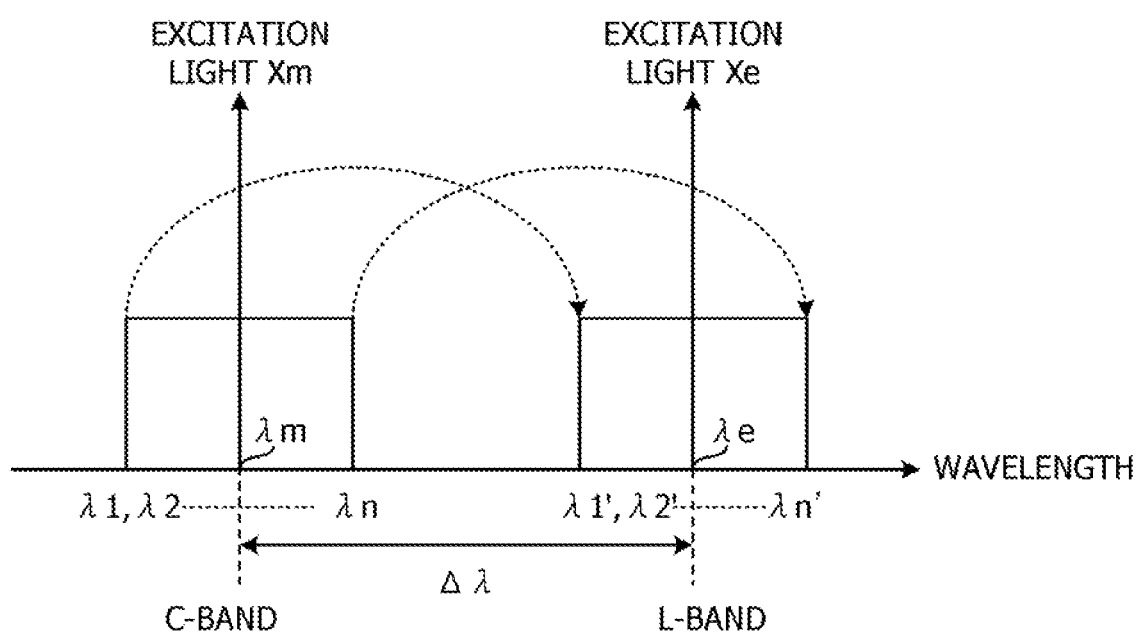
FIG. 4 is a spectrum diagram illustrating an exemplary wavelength conversion scheme based on non-degenerate four-wave mixing.

FIG. 4 is a spectrum diagram illustrating an example of the wavelength conversion scheme based on non-degenerate four-wave mixing. In the wavelength-division multiplex optical signal Sa, for example, optical signals Da having wavelengths λ1 to λn (n: positive integer) in the C-band are wavelength-multiplexed. Furthermore, the central wavelengths of the excitation light Xm and Xe are assumed to be λm and λe, respectively, and a difference therebetween (λe-λm) is assumed to be Δλ.

As indicated by the dotted arrows, the wavelengths λ1 to λn of the optical signal Da are converted into wavelengths λ1' to λn' of the L-band, respectively, which are at positions moved to, on the wavelength axis, the long-wavelength side by the difference Δλ between the central wavelengths λm and λe. This is accurately expressed in terms of frequency, and the wavelength converter 12 converts the wavelengths λ1 to λn into wavelengths approximately satisfying the relationship of (c/λ1−c/λ1')=(c/λm−c/λe). Here, "c" represents a speed of light. Note that, in the case of the wavelength conversion devices 24c and 34a, the wavelength converter 12 converts the wavelengths of the optical signals Dc and Da into wavelengths at positions moved to, on the wavelength axis, the short-wavelength side by the difference Δλ between the central wavelengths λm and λe. This is accurately expressed in terms of frequency, and the wavelength converter 12 converts the wavelengths λ1 to λn into wavelengths approximately satisfying the relationship of (c/λ1'−c/λt)=(c/λm−c/λe).

Referring to FIG. 2 again, the wavelength converter 12 outputs, to the optical amplifier 13, the wavelength-division multiplex optical signal Sa having been subject to the wavelength band conversion. The optical amplifier 13 amplifies the wavelength-division multiplex optical signal Sa, and outputs it to the variable optical attenuator 14.

The variable optical attenuator 14 attenuates the power of the wavelength-division multiplex optical signal Sa input from the optical amplifier 13 for each wavelength of the optical signal Da. The variable optical attenuator 14 is an example of a first attenuator that attenuates the power of the wavelength-division multiplex optical signal La on the output side of the wavelength converter 12 for each wavelength of the optical signal Da in a preceding stage of the tap 11. The variable optical attenuator 14 outputs the attenuated wavelength-division multiplex optical signal Sa to the optical amplifier 15.

The optical amplifier 15 amplifies the wavelength-division multiplex optical signal La input from the variable optical attenuator. The optical amplifier 15 is an example of a first amplifier that amplifies the wavelength-division multiplex optical signal Sa whose power is attenuated by the variable optical attenuator 14 in a preceding stage of the tap 11. The optical amplifier 15 outputs the wavelength-division multiplex optical signal La to the tap 11.

The tap 11 branches the wavelength-division multiplex optical signal Sa on the output side of the wavelength converter 12 toward the wavelength converter 12 and the monitor circuit 16. The tap 11 includes an optical splitter, for example. The tap 11 is an example of a first branch portion that branches the wavelength-division multiplex optical signal Sa on the output side of the wavelength converter 12 to the monitor circuit 16.

The monitor circuit 16 monitors the respective wavelength-division multiplex optical signals Sa on the input side and the output side of the wavelength converter 12. As will be described later, the monitor circuit 16 detects the power of each of the wavelength-division multiplex optical signals Sa on the input side and output side in both of a case where there is bias based on the wavelength and a case where there is no bias based on the wavelength. The monitor circuit 16 outputs, to the control circuit 17, a monitoring result of each of the wavelength-division multiplex optical signals La on the input side and output side.

The control circuit 17 is an example of a controller, and controls the temperature of the wavelength converter 12 on the basis of the monitoring result of the monitor circuit 16. The control circuit 17 is a circuit including at least a part of a central processing unit (CPU), a memory, a field programmable gate array (FPGA), or an application specified integrated circuit (ASIC), for example.

The control circuit 17 controls the temperature of the wavelength converter 12 to suppress the bias of the distribution of the output power with respect to the wavelength, which is caused by the change in the characteristics of the wavelength conversion of the wavelength converter 12 due to a temperature change of the highly non-linear fiber 125, for example. For example, the control circuit 17 controls the temperature of the highly non-linear fiber 125 by controlling a temperature regulator.

Reference signs G21 to G25 indicate exemplary control for suppressing the bias of the output power. The reference sign 321 indicates a power distribution with respect to the wavelength of the optical signal Da in the wavelength-division multiplex optical signal Sa input to the tap 10. The power of the wavelength-division multiplex optical signal Sa is substantially constant regardless of the wavelength.

The reference sign G22 indicates a power ratio ("input/output power ratio") of the optical signal Da in the wavelength-division multiplex optical signal Sa input/output to/from the wavelength converter 12 for each wavelength. While the input/output power ratio of the wavelength converter 12 is substantially constant regardless of the wavelength in an ideal state as indicated by the dotted line, in the case of being deviated from the ideal state due to a temperature change, it becomes lower as it goes toward the long-wavelength side, as an example.

The reference sign 323 indicates a power distribution with respect to the wavelength of the optical signal Da in the wavelength-division multiplex optical signal Sa output from the wavelength converter 12. Due to the conversion characteristics of the wavelength converter 12 indicated by the reference sign G22, the closer the optical signal Da is to the long-wavelength side, the more the output power generated by the wavelength conversion is reduced, whereby the power of the optical signal Da is lower as it goes toward the long-wavelength side.

As described above, the output power of the wavelength-division multiplex optical signal Sa on the output side is biased according to the change in the characteristics of the wavelength conversion of the wavelength converter 12. Meanwhile, the control circuit 17 controls the temperature of the wavelength converter 12 according to the monitoring result of each of the wavelength-division multiplex optical signals Sa on the input side and output side of the wavelength converter 12, thereby reducing the change in the characteristics of the wavelength conversion and suppressing the bias of the output power of the wavelength-division multiplex optical signal Sa on the output side.

Furthermore, the control circuit 17 controls, on the basis of the monitoring result of the monitor circuit 16, the amount of attenuation of the variable optical attenuator 14 and the gain of the optical amplifier 15 to compensate for the bias of the output power of the wavelength-division multiplex optical signal Sa. The reference sign G24 indicates a power ratio ("input/output power ratio") of the optical signal Da in the wavelength-division multiplex optical signal Sa input/output to/from the variable optical attenuator 14 and the optical amplifier 15 for each wavelength.

With the amount of attenuation and the gain controlled by the control circuit 17, the variable optical attenuator 14 and the optical amplifier 15 have the input/output power ratio substantially directly opposite to the input/output power ratio of the wavelength converter 12. For example, the variable optical attenuator 14 and the optical amplifier 15 change the power in such a manner that the output power of the optical signal Da becomes smaller as it goes toward the short-wavelength side.

The reference sign G25 indicates a power distribution with respect to the wavelength of the optical signal Da in the wavelength-division multiplex optical signal Sa output from the optical amplifier 15 and input to the tap 11. The control circuit 17 reduces the bias of the distribution of the output power by the wavelength converter 12, whereby the power of the wavelength-division multiplex optical signal Sa is substantially constant regardless of the wavelength, (Exemplary Configuration of Monitor Circuit)

Figure 5:
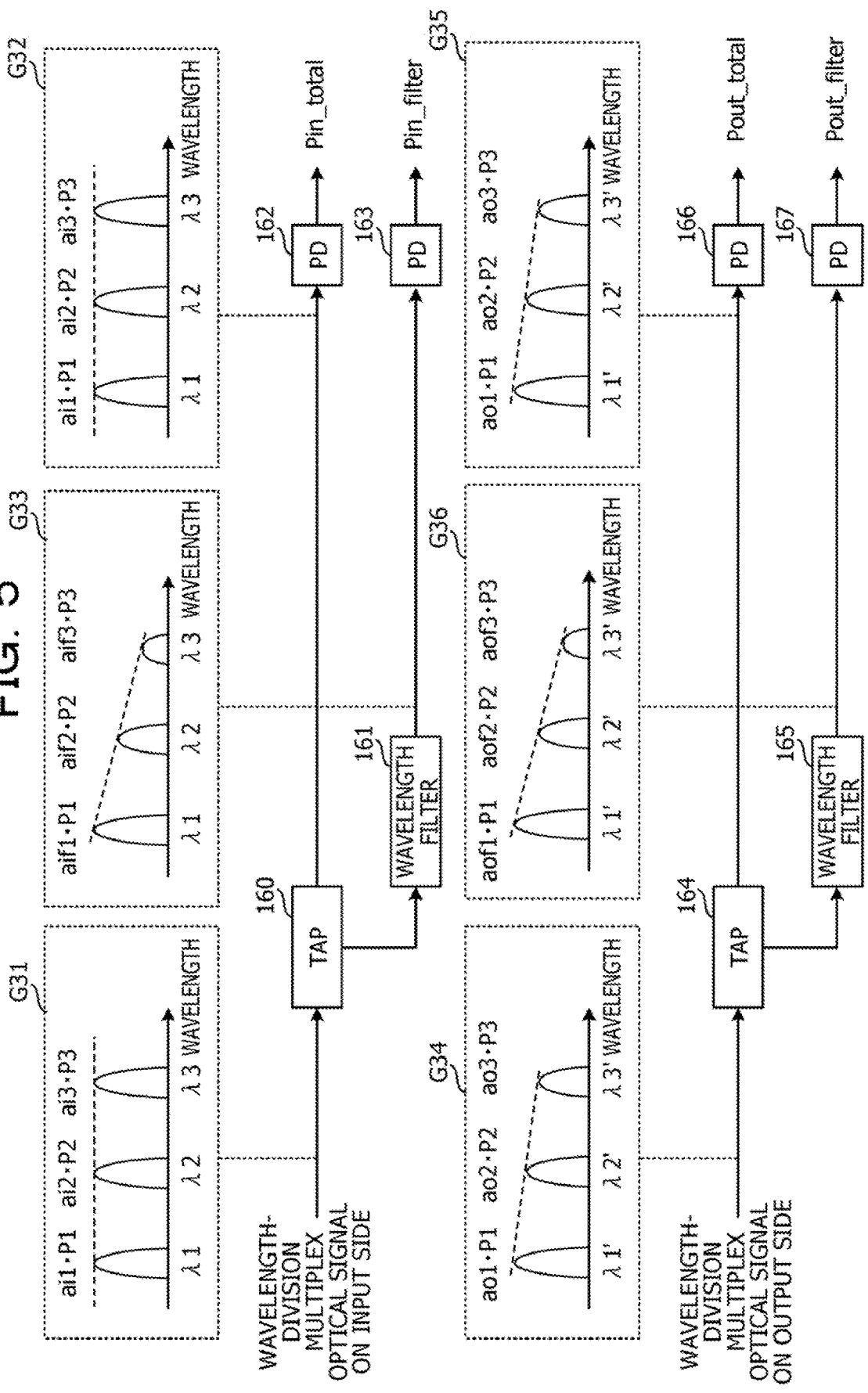
FIG. 5 is a configuration diagram illustrating an example of a monitor circuit.

FIG. 5 is a configuration diagram illustrating an example of the monitor circuit 16. The monitor circuit 16 includes taps 160 and 164, wavelength filters 161 and 165, and photodiodes (PDs) 162, 163, 166, and 167.

The wavelength-division multiplex optical signal Sa on the input side of the wavelength converter 12 is input from the tap 10 to the tap 160, the wavelength filter 161, and the PDs 162 and 163. Reference signs G31 to G33 indicate a power distribution of each optical signal Da with a wavelength $\lambda 1$, $\lambda 2$, or $\lambda 3$ having been subject to wavelength multiplexing with the wavelength-division multiplex optical signal Sa, as an example.

The wavelength-division multiplex optical signal Sa on the input side is input from the tap 10 to the tap 160. As indicated by the reference sign G31, the power of the respective optical signals Da of the wavelength-division multiplex optical signals Sa with the wavelengths $\lambda 1$, $\lambda 2$, and $\lambda 3$ are values obtained by multiplying power P1, P2, and P3 at the time of transmission by coefficients ai1, ai2, and ai3, respectively. At this time, there is virtually no bias in the power distribution of the respective optical signals Da with the wavelengths $\lambda 1$, $\lambda 2$, and $\lambda 3$ (see dotted line).

The tap 160 includes an optical splitter or the like, for example, and branches the wavelength-division multiplex optical signal Sa to the PD 162 and the wavelength filter 161.

As indicated by the reference sign G32, the power distribution of the wavelength-division multiplex optical signal Sa input to the PD 162 is similar to the power distribution of the wavelength-division multiplex optical signal Sa input to the tap 160, and there is virtually no bias (see dotted line).

The PD 162 detects power Pin_total of the wavelength-division multiplex optical signal Sa output from the tap 160. The power Pin_total is the total power of the respective optical signals Da with the wavelengths $\lambda 1$, $\lambda 2$, and $\lambda 3$. Here, the PD 162 is an example of a second detector that detects the power Pin_total of the wavelength-division multiplex optical signal Sa not transmitted through the wavelength filter 16L Furthermore, the power Pin_total is an example of second power. The control circuit 17 obtains the power Pin_total from the PD 162.

The wavelength filter 161 is an example of a first wavelength filter, and transmits the wavelength-division multiplex optical signal Sa in such a manner that the power distribution with respect to the wavelengths $\lambda 1$, $\lambda 2$, and $\lambda 3$ is biased. Since the wavelength filter 161 has different filter coefficients according to the wavelengths $\lambda 1$, $\lambda 2$, and $\lambda 3$, the power of the transmitted light changes depending on the wavelength.

The power of each optical signal Da in the wavelength-division multiplex optical signal Sa on the output side of the wavelength converter 12 is lower as it goes toward the long-wavelength side, whereby the wavelength filter 161 transmits the wavelength-division multiplex optical signal Sa in such a manner that the power decreases as it goes toward the long-wavelength side (see dotted line). As indicated by the reference sign G33, the power of the respective optical signals Da of the transmitted wavelength-division multiplex optical signals La with the wavelengths $\lambda 1$, $\lambda 2$, and $\lambda 3$ are values obtained by multiplying the power P1, P2, and P3 at the time of transmission by coefficients aif1, aif2, and aif3, respectively.

The PD 163 detects power Pin_filter of the wavelength-division multiplex optical signal Sa output from the wavelength filter 161. The power Pin_filter is the total power of the respective optical signals Da with the wavelengths $\lambda 1$, $\lambda 2$, and $\lambda 3$. Here, the PD 163 is an example of a first detector that detects the power Pin_filter of the wavelength-division multiplex optical signal Sa transmitted through the wavelength filter 161. Furthermore, the power Pin_filter is an example of first power. The control circuit 17 obtains the power Pin_filter from the PD 163.

Meanwhile, the wavelength-division multiplex optical signal Sa on the output side of the wavelength converter 12 is input from the tap 11 to the tap 164, the wavelength filter 165, and the PDs 166 and 167. Reference signs G34 to G36 indicate a power distribution of each optical signal Da with a wavelength $\lambda 1'$, $\lambda 2'$, or $\lambda 3'$ having been subject to wavelength multiplexing with the wavelength-division multiplex optical signal Sa, as an example.

The wavelength-division multiplex optical signal Sa on the output side is input from the tap 11 to the tap 164. As indicated by the reference sign G34, the power of the respective optical signals Da of the wavelength-division multiplex optical signals Sa with the wavelengths $\lambda 1'$, $\lambda 2'$, and $\lambda 3'$ are values obtained by multiplying the power P1, P2, and P3 at the time of transmission by coefficients ao1, ao2, and ao3, respectively. At this time, power distribution of the optical signals Da with the respective wavelengths $\lambda 1'$, $\lambda 2'$, and $\lambda 3'$ is biased depending on the characteristics of the wavelength conversion of the wavelength converter 12 and the characteristics of attenuation of the variable optical attenuator 14 and amplification of the optical amplifier 15 (see dotted line).

The tap 164 includes an optical splitter or the like, for example, and branches the wavelength-division multiplex optical signal Sa to the PD 166 and the wavelength filter 165.

As indicated by the reference sign G35, the power distribution of the wavelength-division multiplex optical signals Sa input to the PD 166 is similar to the power distribution of the wavelength-division multiplex optical signals Sa input to the tap 164, and is biased depending on the characteristics of the wavelength conversion of the wavelength converter 12 and the characteristics of attenuation of the variable optical attenuator 14 and amplification of the optical amplifier 15 (see dotted line).

The PD 166 detects power Pout_total of the wavelength-division multiplex optical signal Sa output from the tap 164. The power Pout_total is the total power of the respective optical signals Da with the wavelengths $\lambda 1'$, $\lambda 2'$, and $\lambda 3'$. Here, the PD 166 is an example of a fourth detector that detects the power Pout_total of the wavelength-division multiplex optical signal Sa not transmitted through the wavelength filter 165. Furthermore, the power Pout_total is an example of fourth power. The control circuit 17 obtains the power Pout_total from the PD 166.

The wavelength filter 165 is an example of a second wavelength filter, and transmits the wavelength-division multiplex optical signal Sa in such a manner that the power distribution with respect to the wavelengths $\lambda 1'$, $\lambda 2'$, and $\lambda 3'$ is biased. Since the wavelength filter 161 has different filter coefficients according to the wavelengths $\lambda 1'$, $\lambda 2'$, and $\lambda 3'$, the power of the transmitted light changes depending on the wavelength.

The power of each optical signal Da in the wavelength-division multiplex optical signal Sa on the output side of the wavelength converter 12 is lower as it goes toward the long-wavelength side, whereby the wavelength filter 161 transmits the wavelength-division multiplex optical signal Sa in such a manner that the power decreases as it goes toward the long-wavelength side (see dotted line). As indicated by the reference sign G36, the power of the respective optical signals Da of the transmitted wavelength-division multiplex optical signals Sa with the wavelengths λ1', λ2', and λ3' are values obtained by multiplying the power P1, P2, and P3 at the time of transmission by coefficients aof1, aof2, and aof3, respectively.

The PD 167 detects power Pout_filter of the wavelength-division multiplex optical signal Sa output from the wavelength filter 165. The power Pout_filter is the total power of the respective optical signals Da with the wavelengths λ1', λ2', and λ3', Here, the PD 167 is an example of a third detector that detects the power Pout_filter of the wavelength-division multiplex optical signal Sa transmitted through the wavelength filter 165. Furthermore, the power Pout_filter is an example of third power. The control circuit 17 obtains the power Pout_filter from the PD 167.

The control circuit 17 calculates an input signal tilt amount Ti as an index value of the bias of the power distribution of the wavelength-division multiplex optical signals Sa on the input side from the power Pin_total and Pin_filter of the wavelength-division multiplex optical signals Sa on the input side of the wavelength converter 12.

$$Ti=(aif1 \cdot P1+aif2 \cdot P2+aif3 \cdot P3)/(ai1 \cdot P1+ai2 \cdot P2+ai3 \cdot P3)=Pin\_filter/Pin\_total \quad (1)$$

The control circuit 17 calculates the input signal tilt amount Ti according to the formula (1) set out above. The input signal tilt amount Ti is calculated as a ratio of the non-transmitted power Pin_total relative to the transmitted power Pin_filter of the wavelength filter 161. Note that the control circuit 17 calculates, from the input signal tilt amount Ti, a target tilt amount Tt according to the transmission loss of the transmission line 90 and the like.

Furthermore, the control circuit 17 calculates an output signal tilt amount To as an index value of the bias of the power distribution of the wavelength-division multiplex optical signals Sa on the output side from the power Pout_total and Pout_filter of the wavelength-division multiplex optical signals Sa on the output side of the wavelength converter 12.

$$To=(aof1 \cdot P1+aof2 \cdot P2+aof3 \cdot P3)/(ao1 \cdot P1+ao2 \cdot P2+ao3 \cdot P3)=Pout\_filter/Pout\_total \quad (2)$$

The control circuit 17 calculates the output signal tilt amount To according to the formula (2) set out above. The output signal tilt amount To is calculated as a ratio of the non-transmitted power Pout_total relative to the transmitted power Pout_filter of the wavelength filter 165.

In a case where the biases of the respective power distributions of the wavelength-division multiplex optical signals Sa on the input side and output side are equal to each other, ai1=ao1, ai2=ao2, and ai3=ao3 are established. At this time, assuming that the transmission characteristics of the respective wavelength filters 161 and 165 are the same, aif1=aof1, aif2=aof2, and aif3=aof3 are established. Therefore, Ti (Tt)=To is established.

Accordingly, the control circuit 17 controls the temperature of the wavelength converter 12 in such a manner that the difference between the input signal tilt amount Ti and the output signal tilt amount To decreases. Therefore, the wavelength conversion device 24a appropriately controls the temperature of the wavelength converter 12 from the monitoring result of the bias of the power distribution with respect to the wavelength of the optical signal Da in each wavelength-division multiplex optical signal Sa before and after the wavelength conversion, whereby the bias of the power distribution may be suppressed.

Moreover, the control circuit 17 also controls the amount of attenuation of the variable optical attenuator 14 and the gain of the optical amplifier 15 in such a manner that the difference between the input signal tilt amount Ti and the output signal tilt amount To decreases. Therefore, the wavelength conversion device 24a may compensate for the bias of the power distribution based on the characteristics of the wavelength conversion. Note that the effects described above may be similarly obtained with the other wavelength conversion devices 24c, 34a, and 34c.

Furthermore, both of the wavelength filters 161 and 165 transmit the wavelength-division multiplex optical signal Sa of the wavelength converter 12 in such a manner that the power of the optical signal Da decreases as it goes toward the long-wavelength side. Accordingly, as illustrated in FIG. 4, in a case where the wavelength converter 12 converts the wavelengths λ1, λ2, . . . , and λn of the respective optical signals Da into the wavelengths λ1', λ2', . . . , and λn' at positions moved by a predetermined width 6A on the wavelength axis, the control circuit 17 may calculate the input signal tilt amount Ti and the output signal tilt amount To according to the direction of the bias of the power distribution.

Furthermore, unlike the example of FIG. 3, in the case of converting the wavelength using single excitation light, the wavelength converter 12 converts the wavelengths λ1, λ2, . . . , and λn of the respective optical signals Da into other wavelengths λ1', λ2', . . . , and λn' at symmetric positions on the wavelength axis with the central wavelength of the excitation light in between, as described below.

Figure 6:
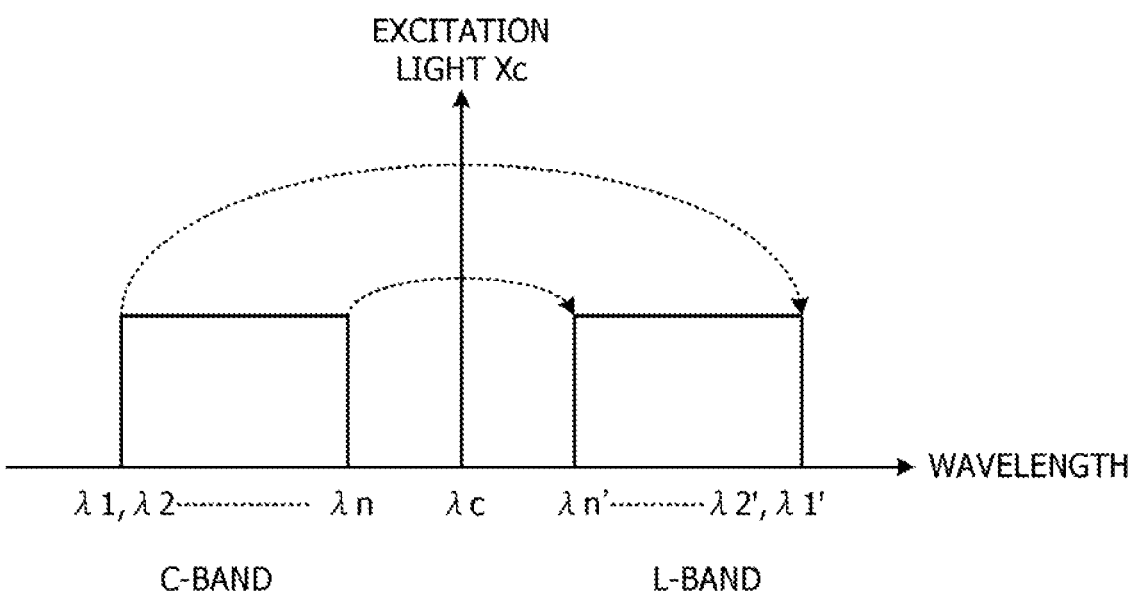
FIG. 6 is a spectrum diagram illustrating an exemplary wavelength conversion scheme based on degenerate four-wave mixing.

FIG. 6 is a spectrum diagram illustrating an exemplary wavelength conversion scheme based on degenerate four-wave mixing. Here, the central wavelength of excitation light Xc is assumed to be λc. Note that, in FIG. 6, description of contents common to those in FIG. 4 will be omitted.

As indicated by the dotted arrows, the wavelengths λ1 to λn of the optical signal Da in the C-band are converted into other wavelengths λ1', λ2', . . . , and λn' at symmetric positions on the wavelength axis with the central wavelength λc of the excitation light Xc in between, respectively. For example, the wavelength λ1 is converted into the wavelength λ1' moved from the central wavelength λc to the long-wavelength side by the difference (λc−λ1) from the central wavelength λc of the excitation light Xc. This is accurately expressed in terms of frequency, and the wavelength converter 12 converts the wavelengths λ1 to λn into wavelengths approximately satisfying the relationship of $c/\lambda1'=(2c/\lambda c-c/\lambda1)$. The wavelength λn is converted into the wavelength λn' moved from the central wavelength λc to the long-wavelength side by the difference (λc−λn) from the central wavelength λc of the excitation light Xc. This is accurately expressed in terms of frequency, and the wavelength converter 12 converts the wavelengths λ1 to λn into wavelengths approximately satisfying the relationship of $c/\lambda n'=(2c/\lambda c-c/\lambda n)$.

Figure 7:
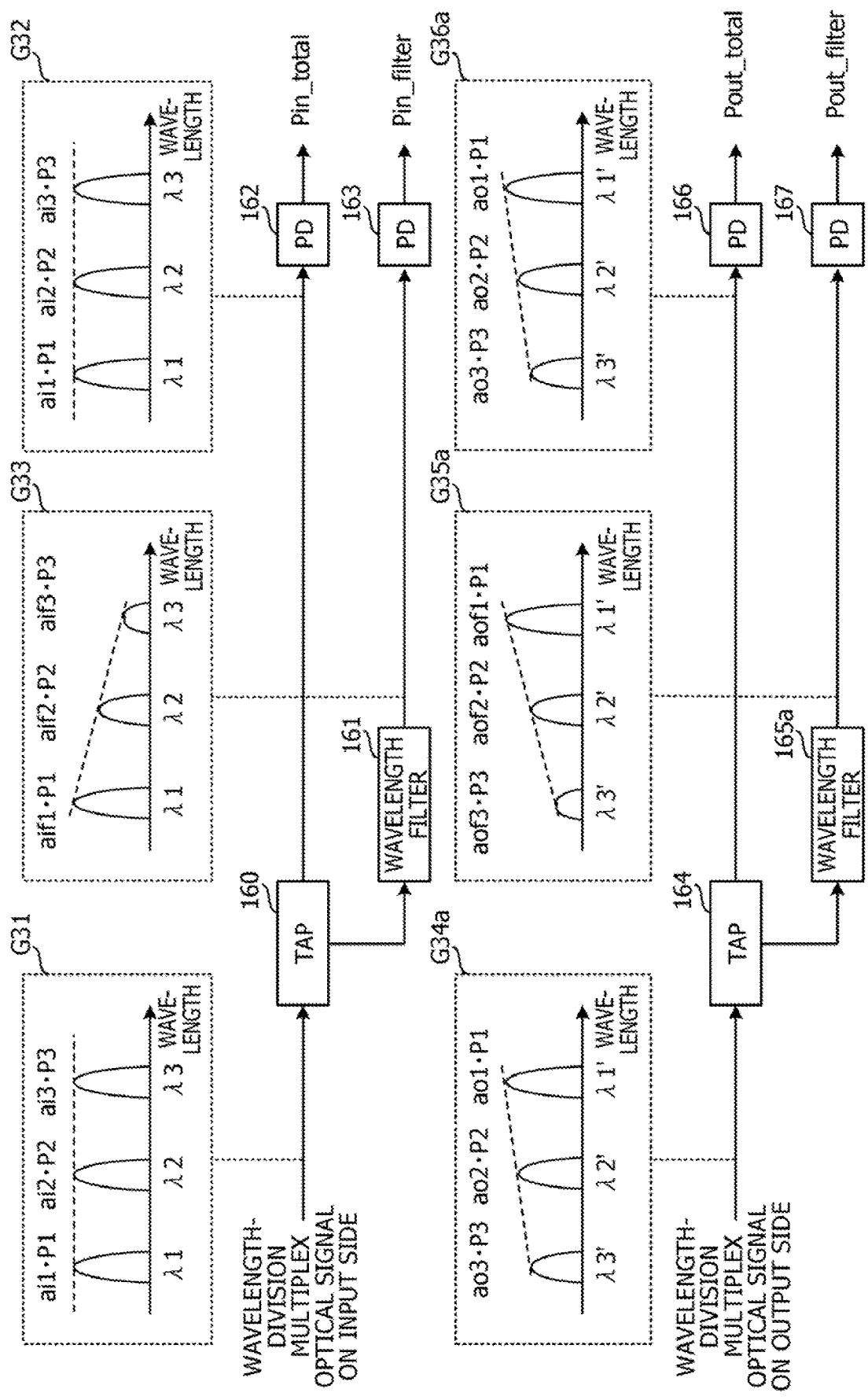
FIG. 7 is a configuration diagram illustrating another example of the monitor circuit.

Accordingly, the order of the wavelengths λ1, λ2, . . . , and λn on the wavelength axis is reversed by the wavelength conversion. Therefore, as described below, the monitor circuit 16 transmits the wavelength-division multiplex optical signals Sa in such a manner that the direction of the bias of the power distribution of the wavelength-division multiplex optical signals La on the output side of the wavelength converter 12 becomes opposite to that of the example of FIG. 5, FIG. 7 is a configuration diagram illustrating another example of the monitor circuit 16. In FIG. 7, configurations common to those in FIG. 5 are denoted by the same reference signs, and descriptions thereof will be omitted. The monitor circuit 16 includes the taps 160 and 164, wavelength filters 161 and 165a, and the PDs 162, 163, 166, and 167.

Reference signs G34a to G36a indicate a power distribution of each optical signal Da with a wavelength λ1, λ2, or λ3 having been subject to wavelength multiplexing with the wavelength-division multiplex optical signal Sa on the output side of the wavelength converter 12. As it can be understood by comparing with the bias of the power distribution indicated by the reference signs G34 to G36 of FIG. 5, the direction of the bias of the power distribution is opposite to that of the example of FIG. 5.

The output power of the wavelength-division multiplex optical signal Sa becomes smaller as the wavelength (λ3) is closer to the short-wavelength side by the wavelength conversion of the wavelength converter 12. Therefore, the wavelength filter 165a transmits the wavelength-division multiplex optical signal Sa in such a manner that the power decreases as it goes toward the short-wavelength side (see dotted line). For example, the wavelength filter 165a transmits the wavelength-division multiplex optical signal Sa in such a manner that the power decreases as the wavelength of the optical signal is closer to the opposite side of the wavelength filter 161 that transmits the wavelength-division multiplex optical signal Sa on the input side.

Therefore, even in a case where the wavelength converter 12 converts the wavelength using the single excitation light Xc, the control circuit 17 may calculate the input signal tilt amount Ti and the output signal tilt amount To according to the direction of the bias of the power distribution. Note that, although the case where the wavelength converter 12 converts the wavelength into another wavelength on the long-wavelength side has been mentioned in the example described above, configurations and functions similar to the contents described above may be applied even in a case where the wavelength converter 12 converts the wavelength into another wavelength on the short-wavelength side.

Second Embodiment

Figure 8:
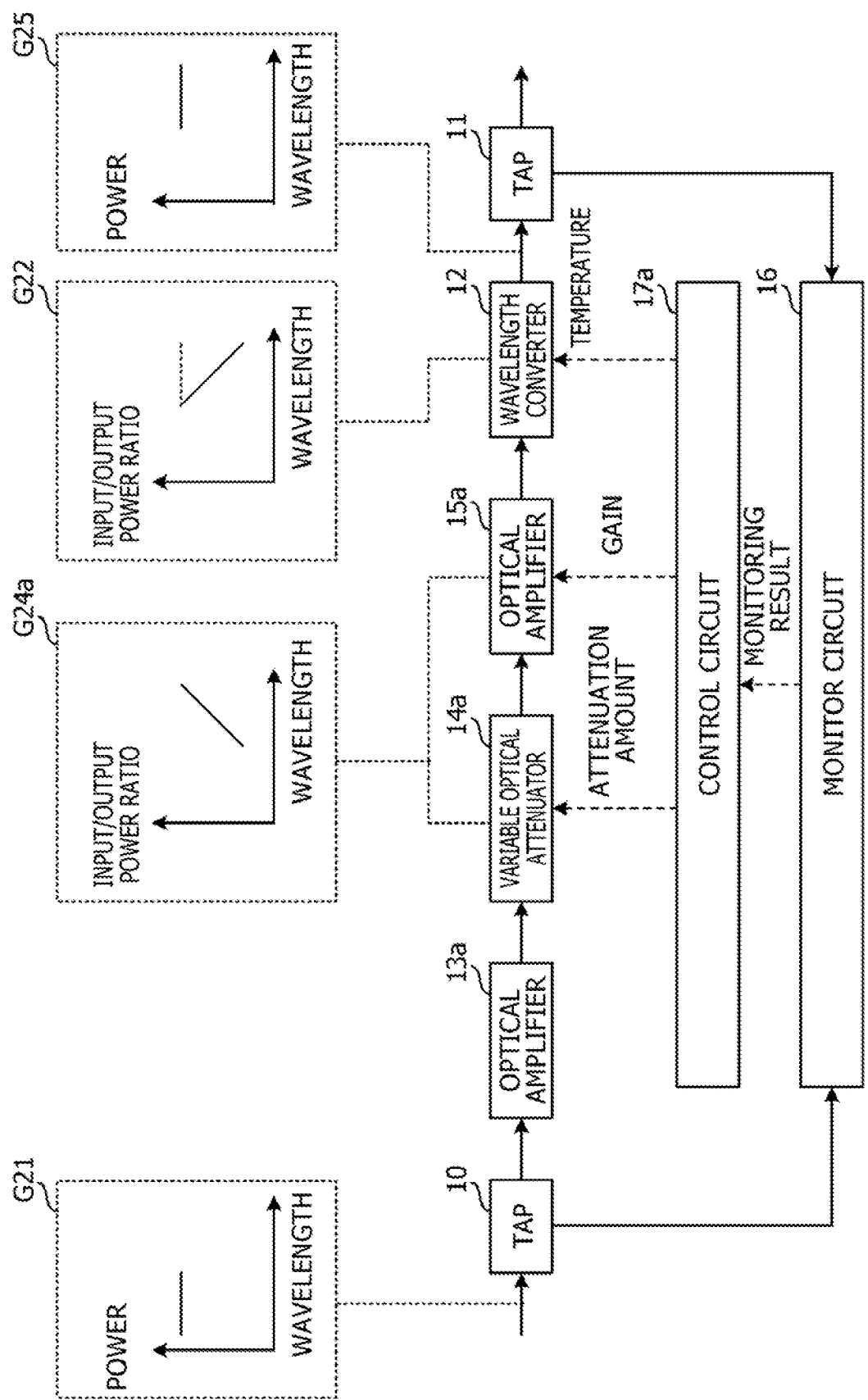
FIG. 8 is a configuration diagram illustrating a wavelength conversion device according to a second embodiment.

FIG. 8 is a configuration diagram illustrating wavelength conversion devices 24a, 24c, 34a, and 34c according to a second embodiment. In FIG. 8, configurations common to those in FIG. 2 are denoted by the same reference signs, and descriptions thereof will be omitted. Note that, while the wavelength conversion device 24a will be exemplified in the following descriptions, the other wavelength conversion devices 24c, 34a, and 34c have similar configurations and functions.

The wavelength conversion device 24a includes, in place of optical amplifiers 13 and 15 and a variable optical attenuator 14, optical amplifiers 13a and 15a and a variable optical attenuator 14a in a preceding stage of a wavelength converter 12.

The optical amplifier 13a amplifies a wavelength-division multiplex optical signal Sa input from a tap 10, and outputs it to the variable optical attenuator 14a. The variable optical attenuator 14a attenuates the power of the wavelength-division multiplex optical signal Sa for each wavelength of an optical signal Da, and outputs it to the optical amplifier 15a. The variable optical attenuator 14a is an example of a second attenuator that attenuates the power of the wavelength-division multiplex optical signal Sa on the output side of the wavelength converter 12 for each wavelength of the optical signal Da in a succeeding stage of the tap 10.

The optical amplifier 15a amplifies the wavelength-division multiplex optical signal Sa, and outputs it to the wavelength converter 12. The optical amplifier 15a is an example of a second amplifier that amplifies the wavelength-division multiplex optical signal Sa whose power is attenuated by the variable optical attenuator 14a in a succeeding stage of the tap 10.

A control circuit 17a is an example of a controller, and is provided in place of the control circuit 17 described above. The control circuit 17a controls the amount of attenuation of the variable optical attenuator 14a, the gain of the optical amplifier 15a, and the temperature of the wavelength converter 12 in such a manner that the difference between an input signal tilt amount Ti and an output signal tilt amount To decreases. As indicated by a reference sign G24a, with the amount of attenuation and the gain controlled by the control circuit 17, the variable optical attenuator 14a and the optical amplifier 15a have the input/output power ratio substantially directly opposite to the input/output power ratio of the wavelength converter 12, in a similar manner to the first embodiment. For example, the variable optical attenuator 14a and the optical amplifier 15a change the power in such a manner that the output power of the optical signal Da becomes smaller as it goes toward the short-wavelength side. Therefore, the wavelength conversion device 24a may compensate for the bias of the power distribution based on the characteristics of the wavelength conversion.

Furthermore, since the variable optical attenuator 14a and the optical amplifier 15a are provided in a preceding stage of the wavelength converter 12 in the present example, the power of the wavelength-division multiplex optical signal Sa input to the wavelength converter 12 may be controlled promptly as compared with the case where the variable optical attenuator 14 and the optical amplifier 15 are provided in a succeeding stage as in the first embodiment. Note that the effects described above may be similarly obtained with the other wavelength conversion devices 24c, 34a, and 34c.

Figure 9:
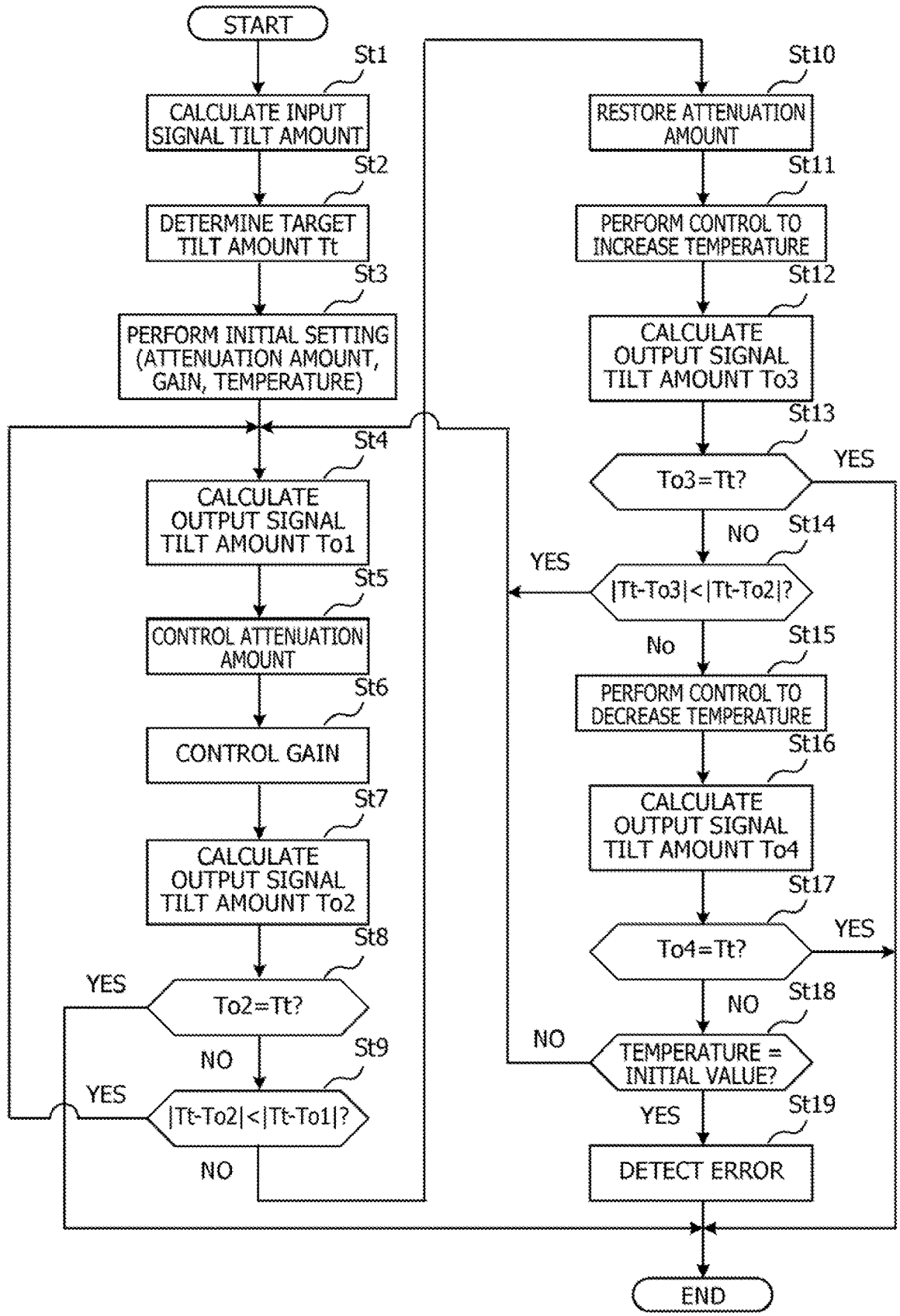
FIG. 9 is a flowchart illustrating a control process of control circuits according to the first and second embodiments.

FIG. 9 is a flowchart illustrating a control process of the control circuits 17 and 17a according to the first and second embodiments. The control circuits 17 and 17a calculates the input signal tilt amount Ti from power Pin_total and Pin_filter of the wavelength-division multiplex optical signal Sa on the input side obtained from a monitor circuit 16 (step St1). The input signal tilt amount Ti is, for example, 1.0 (dB).

Next, the control circuits 17 and 17a determine a target tilt amount Tt from the input signal tilt amount Ti (step St2). The target tilt amount Tt is, for example, 0.5±0.2 (dB). At this time, the control circuits 17 and 17a may determine the target tilt amount Tt by correcting the input signal tilt amount Ti on the basis of transmission characteristics of a transmission line 90, for example, or the input signal tilt amount Ti may be determined to be the target tilt amount Tt as it is. Note that the control circuits 17 and 17a store the target tilt amount Tt in a memory or the like.

Next, the control circuits 17 and 17a execute initial setting of the amount of attenuation of the variable optical attenuators 14 and 14a, the gain of the optical amplifiers 15 and 15a, and the temperature of the wavelength converter 12 (step St3). For example, the amount of attenuation is set to 0 (dB), for example, and the gain is set to a value at which the output power of the optical amplifier 15 is 20 (dB), and the temperature is set to 30 (degrees). Next, the control circuits 17 and 17a calculates an output signal tilt amount Tot (To) from power Pout_total and Pout_filter of the wavelength-division multiplex optical signal Sa on the output side obtained from the monitor circuit 16 (step St4). The output signal tilt amount To1 is, for example, 4.5 (dB). Note that the control circuits 17 and 17a store the calculated output signal tilt amount To1 in a memory or the like.

Next, the control circuits 17 and 17a control the amount of attenuation of the variable optical attenuator 14 in such a manner that the difference between the target tilt amount Tt and the output signal tilt amount Tot decreases (step St5). The control circuits 17 and 17a increase the amount of attenuation by 1 (dB), for example. Next, the control circuits 17 and 17a control the gain of the optical amplifiers 15 and 15a in such a manner that the difference between the target tilt amount Tt and the output signal tilt amount To1 decreases while maintaining the power of the wavelength-division multiplex optical signal Sa on the output side of the wavelength converter 12 at the initial value (20 (dB)) (step St6).

Next, the control circuits 17 and 17a calculate an output signal tilt amount To2 (To) (step St7). The output signal tilt amount To2 is, for example, 20 (dB). Note that the control circuits 17 and 17a store the calculated output signal tilt amount To2 in a memory or the like.

Next, the control circuits 17 and 17a compare the target tdt amount Tt and the output signal tilt amount To2 (step St8). At this time, the control circuits 17 and 17a regard the target tilt amount Tt and the output signal tilt amount To2 as the same value if the difference between the target tilt amount Tt and the output signal tilt amount To2 (|Tt−To2|) is equal to or less than a predetermined threshold value, for example.

When the target tilt amount Tt and the output signal tilt amount To2 are the same value (Yes in step St8), the control circuits 17 and 17a interpret that the bias of the power with respect to the wavelength of each optical signal Da in the wavelength-division multiplex optical signal Sa is sufficiently suppressed, and the process is terminated.

Furthermore, when the target tilt amount Tt and the output signal tilt amount To2 are different (No in step St8), the control circuits 17 and 17a compare the difference between the target tilt amount Tt and the output signal tilt amount To2 (|Tt−To2|) and the difference between the target tilt amount Tt and the output signal tilt amount To1 (|Tt−To1|) (step St9). If |Tt−To2|<|Tt−To1| is satisfied (Yes in step St9), the control circuits 17 and 17a interpret that the output signal tilt amount To2 has approached the target tilt amount Tt, and execute each processing starting from step St4 again to continue the control of the amount of attenuation and the gain.

Furthermore, when |Tt−To2|≥|Tt−To1| is satisfied (No in step St9), the control circuits 17 and 17a interpret that the output signal tilt amount To2 does not approach the target tilt amount Tt, and restore the amount of attenuation of the variable optical attenuators 14 and 14a to the value before the recent execution of step St5 (step St10). For example, if the amount of attenuation has been increased by 1 (dB) in the recent step St5, the control circuits 17 and 17a decrease the amount of attenuation by 1 (dB).

Next, the control circuits 17 and 17a increase the temperature of the wavelength converter 12 from the initial value in such a manner that the difference between the target tilt amount Tt and the output signal tilt amount Tot decreases (step St11). The control circuits 17 and 17a increase the temperature by, for example, 1 degree.

Next, the control circuits 17 and 17a calculate an output signal tilt amount To3 (To) (step St12). The output signal tilt amount To3 is, for example, 1.8 (dB). Note that the control circuits 17 and 17a store the calculated output signal tilt amount To3 in a memory or the like.

Next, the control circuits 17 and 17a compare the target tilt amount Tt and the output signal tilt amount To3 (step St13). At this time, the control circuits 17 and 17a regard the target tilt amount Tt and the output signal tilt amount To3 as the same value when the difference between the target tilt amount Tt and the output signal tilt amount To3 (|Tt−To3|) is equal to or less than a predetermined threshold value, for example.

When the target tilt amount Tt and the output signal tilt amount To3 are the same value (Yes in step St13), the control circuits 17 and 17a interpret that the bias of the power with respect to the wavelength of each optical signal Da in the wavelength-division multiplex optical signal Sa is sufficiently suppressed, and the process is terminated.

Furthermore, when the target tilt amount Tt and the output signal tilt amount To3 are different (No in step St13), the control circuits 17 and 17a compare the difference between the target tilt amount Tt and the output signal tilt amount To3 (|Tt−To3|) and the difference between the target tilt amount Tt and the output signal tilt amount To2 (|Tt−To2|) (step St14). When |Tt−To3|<|Tt−To2| is satisfied (Yes in step St14), the control circuits 17 and 17a interpret that the output signal tilt amount To3 has approached the target tilt amount Tt, and execute each processing starting from step St4 again to continue the increase control of the temperature of the wavelength converter 12.

Furthermore, when |Tt−To3|≥|Tt−To2| is satisfied (No in step St14), the control circuits 17 and 17a interpret that the output signal tilt amount To3 does not approach the target tilt amount Tt, and decrease the temperature of the wavelength converter 12 from the initial value (step St15). For example, when the temperature has been increased by 1 degree in step St11, the control circuits 17 and 17a decrease the temperature by 2 degrees.

Next, the control circuits 17 and 17a calculate an output signal tilt amount To4 (To) (step St16). The output signal tilt amount To4 is, for example, 0.5 (dB). Note that the control circuits 17 and 17a store the calculated output signal tilt amount To4 in a memory or the like.

Next, the control circuits 17 and 17a compare the target tilt amount Tt and the output signal tilt amount To4 (step St17). At this time, the control circuits 17 and 17a regard the target tilt amount Tt and the output signal tilt amount To4 as the same value when the difference between the target tilt amount Tt and the output signal tilt amount To4 (|Tt−To4|) is equal to or less than a predetermined threshold value, for example.

When the target tilt amount Tt and the output signal tilt amount To4 are the same value (Yes in step St17), the control circuits 17 and 17a interpret that the bias of the power with respect to the wavelength of each optical signal Da in the wavelength-division multiplex optical signal Sa is sufficiently suppressed, and the process is terminated.

Furthermore, if the target tilt amount Tt and the output signal tilt amount To4 are different (No in step St17), the control circuits 17 and 17a compare the temperature set in the wavelength converter 12 and the initial value (step St18). When the temperature set in the wavelength converter 12 and the initial value are different (No in step St18), the control circuits 17 and 17a execute each processing starting from step St4 to execute the temperature control again.

Furthermore, if the temperature set in the wavelength converter 12 and the initial value are the same (Yes in step St18), the control circuits 17 and 17a determine that it is impossible to suppress the bias of the power distribution based on the temperature control, and detect an error (step St19), and the process is terminated.

Third Embodiment

Figure 10:
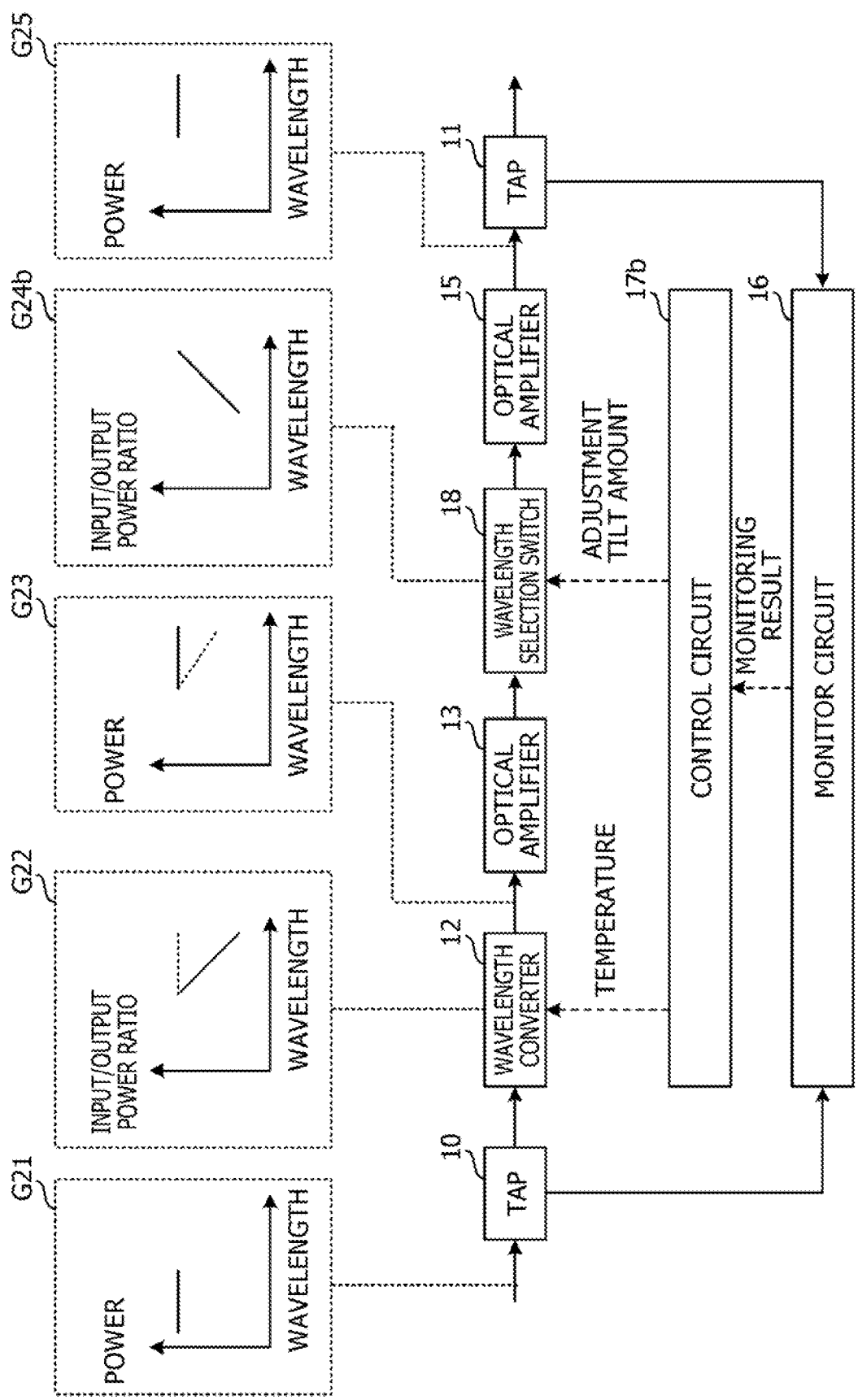
FIG. 10 is a configuration diagram illustrating a wavelength conversion device according to a third embodiment.

FIG. 10 is a configuration diagram illustrating wavelength conversion devices 24a, 24c, 34a, and 34c according to a third embodiment. In FIG. 10, configurations common to those in FIG. 2 are denoted by the same reference signs, and descriptions thereof will be omitted. Note that, while the wavelength conversion device 24a will be exemplified in the following descriptions, the other wavelength conversion devices 24c, 34a, and 34c have similar configurations and functions.

The wavelength conversion device 24a includes a wavelength selection switch 18 in a succeeding stage of a wavelength converter 12 in place of a variable optical attenuator 14. Furthermore, the wavelength conversion device 24a includes, as an example of a controller, a control circuit 17b in place of a control circuit 17.

The wavelength selection switch 18 adjusts power distribution with respect to the wavelength of each optical signal Da in a wavelength-division multiplex optical signal Sa amplified by an optical amplifier 13. The wavelength selection switch 18 adjusts the power distribution by, for example, changing a filter coefficient of an optical filter corresponding to each wavelength of the optical signal Da.

Here, an amount of adjustment of the bias of the power distribution adjusted by the wavelength selection switch 18 will be referred to as an "adjustment tilt amount". In a similar manner to the formulae (1) and (2) mentioned above, the adjustment tilt amount is calculated from the power ratio of the respective wavelength-division multiplex optical signals Sa on the input side and output side of the wavelength selection switch 18. Note that the wavelength selection switch 18 is an example of a first optical filter that adjusts, in a preceding stage of a tap 11, the power distribution with respect to the wavelength of each optical signal Da having been subject to wavelength multiplexing with the wavelength-division multiplex optical signal Sa on the output side of the wavelength converter 12.

The control circuit 17b controls the adjustment tilt amount of the wavelength selection switch 18 and the temperature of the wavelength converter 12 in such a manner that the difference between the input signal tilt amount Ti and the output signal tilt amount To obtained from a monitor circuit 16 decreases.

A reference sign G24b indicates a power ratio ("input/output power ratio") of the optical signal Da in the wavelength-division multiplex optical signal Sa input/output to/from the wavelength selection switch 18 for each wavelength. The control circuit 17b controls the adjustment tilt amount of the wavelength selection switch 18 to indicate the input/output power ratio opposite to the input/output power ratio (see reference sign G22) based on the characteristics of wavelength conversion of the wavelength converter 12.

The wavelength selection switch 18 sets the adjustment tilt amount in such a manner that the input/output power ratio becomes higher as the wavelength is closer to the long-wavelength side, for example, under the control of the control circuit 17b. Therefore, the wavelength conversion device 24a may compensate for the bias of the power distribution due to the characteristics of the wavelength conversion, such as the power distribution indicated by the reference sign G25.

Fourth Embodiment

Figure 11:
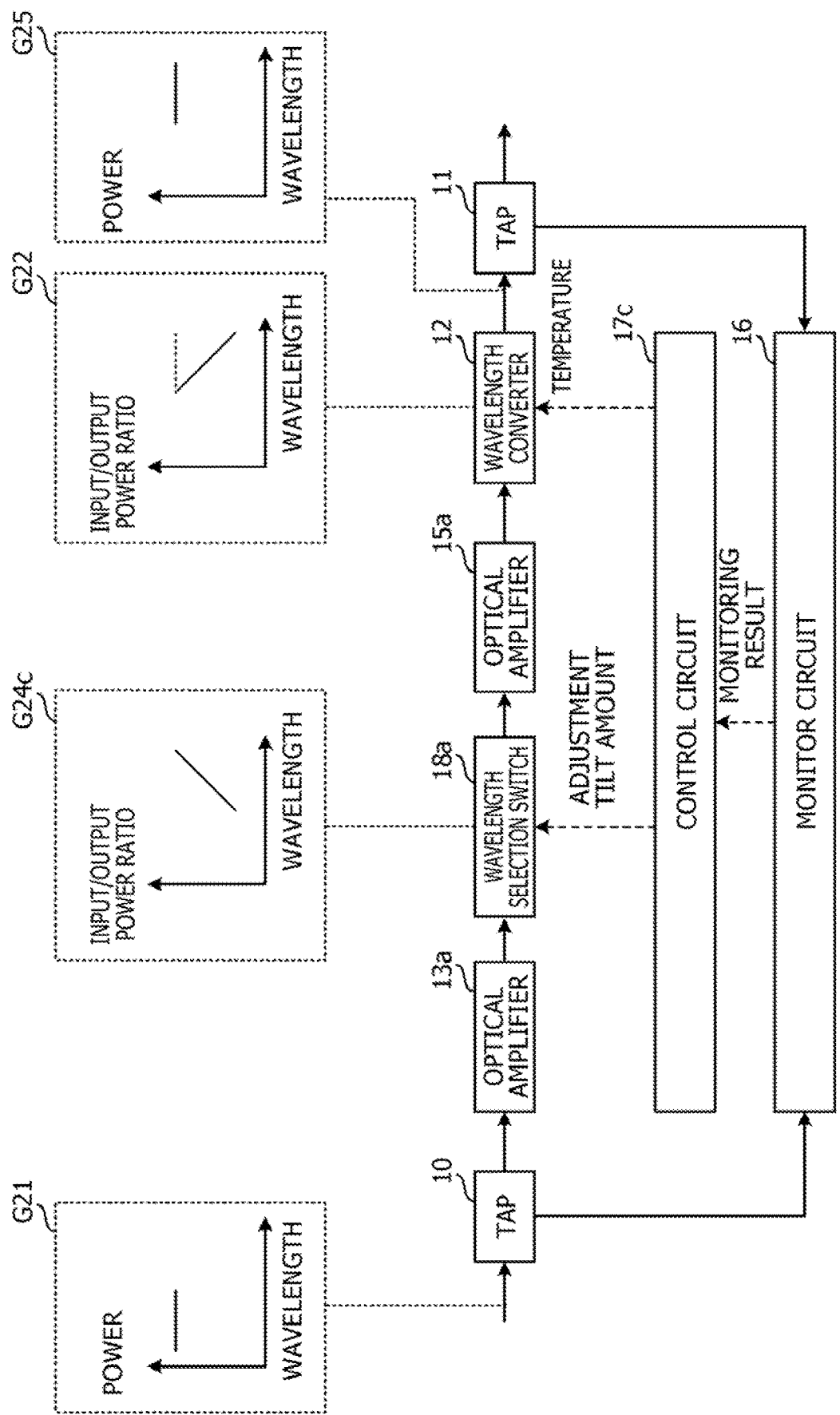
FIG. 11 is a configuration diagram illustrating a wavelength conversion device according to a fourth embodiment.

FIG. 11 is a configuration diagram illustrating wavelength conversion devices 24a, 24c, 34a, and 34c according to a fourth embodiment. In FIG. 11, configurations common to those in FIG. 8 are denoted by the same reference signs, and descriptions thereof will be omitted. Note that, while the wavelength conversion device 24a will be exemplified in the following descriptions, the other wavelength conversion devices 24c, 34a, and 34c have similar configurations and functions.

The wavelength conversion device 24a includes, in place of optical amplifiers 13 and 15 and a wavelength selection switch 18, optical amplifiers 13a and 15a and a wavelength selection switch 18a in a preceding stage of a wavelength converter 12. Furthermore, the wavelength conversion device 24a includes, as an example of a controller, a control circuit 17c in place of a control circuit 17.

The wavelength selection switch 18a has a function similar to that of the wavelength selection switch 18. The wavelength selection switch 18a is an example of a second optical filter that adjusts, in a succeeding stage of a tap 10, the power distribution with respect to the wavelength of each optical signal Da having been subject to wavelength multiplexing with a wavelength-division multiplex optical signal Sa on the input side of the wavelength converter 12. A reference sign G24c indicates a power ratio ("input/output power ratio") of the optical signal Da in the wavelength-division multiplex optical signal Sa input/output to/from the wavelength selection switch 18a for each wavelength.

The wavelength selection switch 18a sets an adjustment tilt amount in such a manner that the input/output power ratio becomes higher as the wavelength is closer to the long-wavelength side, for example, under the control of the control circuit 17c. Therefore, the wavelength conversion device 24a may compensate for the bias of the power distribution due to the characteristics of the wavelength conversion, such as the power distribution indicated by the reference sign G25.

Furthermore, since the wavelength selection switch 18a is provided in a preceding stage of the wavelength converter 12 in the present example, the power of the wavelength-division multiplex optical signal Sa input to the wavelength converter 12 may be controlled promptly as compared with the case where the wavelength selection switch 18 is provided in a succeeding stage as in the first embodiment. Note that the effects described above may be similarly obtained with the other wavelength conversion devices 24c, 34a, and 34c.

Figure 12:
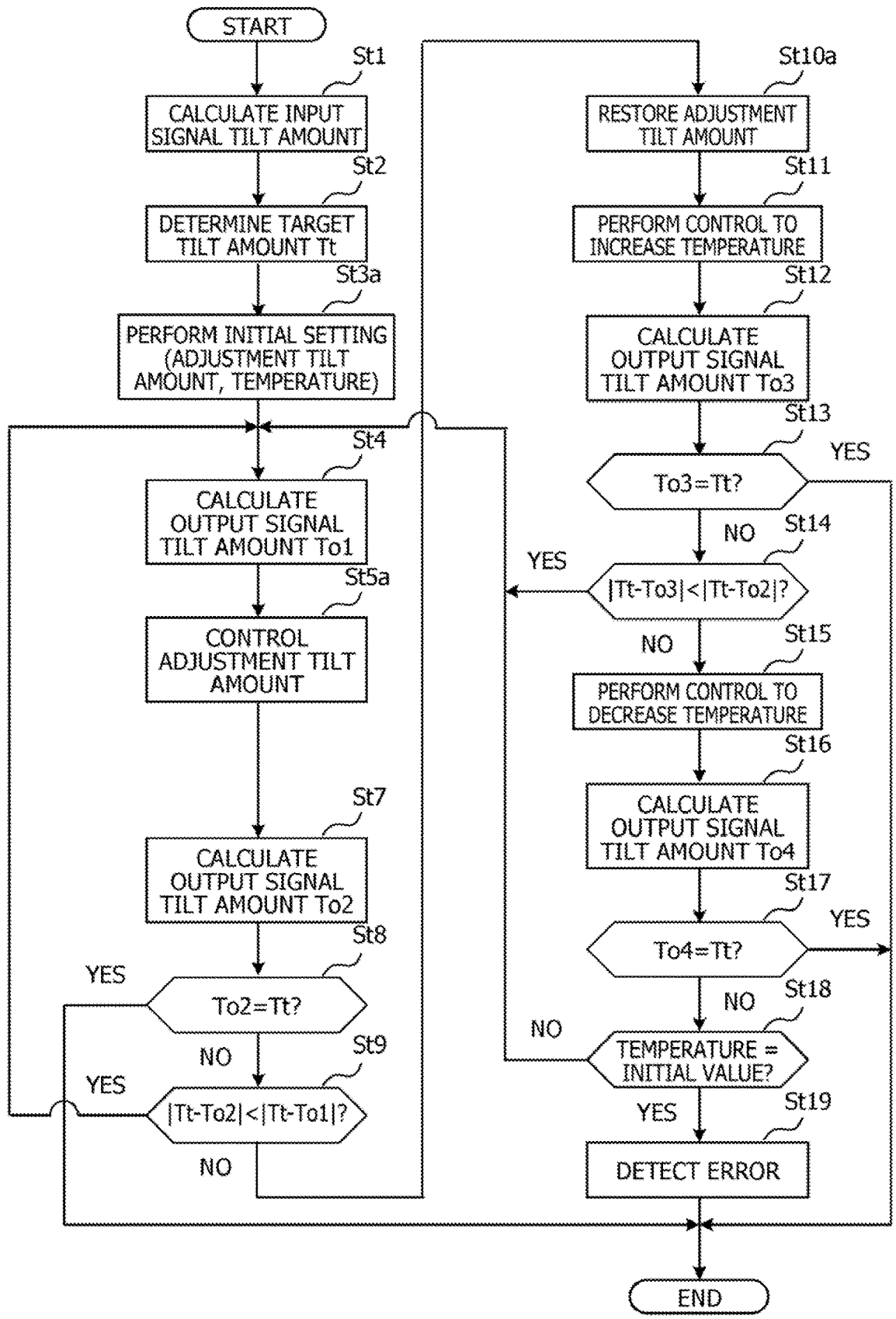
FIG. 12 is a flowchart illustrating a control process of control circuits according to the third and fourth embodiments.

FIG. 12 is a flowchart illustrating a control process of control circuits 17b and 17c according to the third and fourth embodiments. In FIG. 12, processing common to that in FIG. 9 is denoted by the same reference sign, and descriptions thereof will be omitted. The difference in process from the first and second embodiments will be described below.

In step St3a, the control circuits 17b and 17c execute initial setting of the adjustment tilt amount of the wavelength selection switches 18 and 18a and the temperature of the wavelength converter 12. The adjustment tilt amount of the wavelength selection switches 18 and 18a is, for example, 0 (dB).

Furthermore, in step St5a, the control circuits 17b and 17c control the adjustment tilt amount of the wavelength selection switch 18 in such a manner that the difference between an input signal tilt amount Ti and an output signal tilt amount To obtained from a monitor circuit 16 decreases. The control circuits 17b and 17c increase the adjustment tilt amount of the wavelength selection switch 18 by 0.5 (dB), for example.

Furthermore, in step St10a, when |Tt−To2|≥|Tt−To1| is satisfied (No in step St9), the control circuits 17b and 17c interpret that an output signal tilt amount To2 does not approach a target tilt amount Tt, and restore the adjustment tilt amount of the wavelength selection switch 18 to the value before the recent execution of step St5a. For example, when the adjustment tilt amount has been increased by 0.5 (dB) in step St5a, the control circuits 17b and 17c decrease the adjustment tilt amount by 0.5 (dB).

As described above, the control circuits 17b and 17c may also suppress the bias of the power distribution based on the characteristics of the wavelength conversion of the wavelength converter 12 by controlling the adjustment tilt amount of the wavelength selection switch 18. Note that the wavelength conversion method according to the embodiments is a wavelength conversion method to be executed by the wavelength conversion devices 24a, 24c, 34a, and 34c described above.

The embodiments described above are preferred embodiments. However, they are not limited thereto, and a variety of modifications may be made without departing from the gist of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength conversion device comprising:
   a wavelength converter configured to convert a wavelength band of a wavelength-division multiplex optical signal in which a plurality of optical signals is wavelength-multiplexed;
   a first wavelength filter configured to transmit the wavelength-division multiplex optical signal on an input side of the wavelength converter such that power distribution with respect to a wavelength of the plurality of optical signals is biased;
   a second wavelength filter configured to transmit the wavelength-division multiplex optical signal on an output side of the wavelength converter such that the power distribution with respect to the wavelength of the plurality of optical signals is biased;
   a first detector configured to detect first power of the wavelength-division multiplex optical signal which have been transmitted through the first wavelength filter on the input side of the wavelength converter;
   a second detector configured to detect second power of the wavelength-division multiplex optical signal which is not transmitted through the first wavelength filter on the input side of the wavelength converter;
   a third detector configured to detect third power of the wavelength-division multiplex optical signal which have been transmitted through the second wavelength filter on the output side of the wavelength converter;
   a fourth detector configured to detect fourth power of the wavelength-division multiplex optical signal which is not transmitted through the second wavelength filter on the output side of the wavelength converter; and
   a controller configured to control a temperature of the wavelength converter such that a difference between a first ratio of the second power to the first power and a second ratio of the fourth power to the third power decreases.

2. The wavelength conversion device according to claim 1, wherein
   the wavelength converter converts a wavelength of each of the plurality of optical signals into another wavelength at a symmetric position on a wavelength axis with a predetermined central wavelength in between,
   the first wavelength filter transmits the wavelength-division multiplex optical signal on the input side of the wavelength converter such that, among the plurality of optical signals, power of an optical signal of a wavelength on one of a long-wavelength side or a short-wavelength side decreases, and
   the second wavelength filter transmits the wavelength-division multiplex optical signal on the output side of the wavelength converter such that, among the plurality of optical signals, power of an optical signal of a wavelength on an opposite side of the first wavelength filter decreases.

3. The wavelength conversion device according to claim 1, wherein
   the wavelength converter converts a wavelength of each of the plurality of optical signals into another wavelength at a position moved by a predetermined width on a wavelength axis,
   the first wavelength filter transmits the wavelength-division multiplex optical signal on the input side of the wavelength converter such that, among the plurality of optical signals, power of an optical signal of a wavelength on one of a long-wavelength side or a short-wavelength side decreases, and
   the second wavelength filter transmits the wavelength-division multiplex optical signal on the output side of the wavelength converter such that, among the plurality of optical signals, power of an optical signal of a wavelength on the same side of the first wavelength filter decreases.

4. The wavelength conversion device according to claim 1, further comprising:
   a first coupler configured to branch the wavelength-division multiplex optical signal on the output side of the wavelength converter to the second wavelength filter and the fourth detector;
   a first attenuator configured to attenuate power of the wavelength-division multiplex optical signal on the output side of the wavelength converter for each wavelength of the plurality of optical signals in a preceding stage of the first branch portion; and
   a first amplifier configured to amplify the wavelength-division multiplex optical signal whose power is attenuated by the first attenuator in a preceding stage of the first branch portion, wherein
   the controller controls an amount of attenuation of the first attenuator, gain of the first amplifier, and the temperature of the wavelength converter such that the difference between the first ratio and the second ratio decreases.

5. The wavelength conversion device according to claim 1, further comprising:
- a second coupler configured to branch the wavelength-division multiplex optical signal on the input side of the wavelength converter to the first wavelength filter and the second detector;
- a second attenuator configured to attenuate power of the wavelength-division multiplex optical signal on the input side of the wavelength converter for each wavelength of the plurality of optical signals in a succeeding stage of the second branch portion; and
- a second amplifier configured to amplify the wavelength-division multiplex optical signal whose power is attenuated by the second attenuator in a succeeding stage of the second branch portion, wherein
- the controller controls an amount of attenuation of the second attenuator, gain of the second amplifier, and the temperature of the wavelength converter such that the difference between the first ratio and the second ratio decreases.

6. The wavelength conversion device according to claim 1, further comprising:
- a first coupler configured to branch the wavelength-division multiplex optical signal on the output side of the wavelength converter to the second wavelength filter and the fourth detector; and
- a first optical filter configured to adjust, in a preceding stage of the first branch portion, power distribution with respect to a wavelength of each of the plurality of optical signals wavelength-multiplexed to the wavelength-division multiplex optical signal on the output side of the wavelength converter, wherein
- the controller controls an amount of adjustment of the power distribution of the first optical filter and the temperature of the wavelength converter such that the difference between the first ratio and the second ratio decreases.

7. The wavelength conversion device according to claim 1, further comprising:
- a second coupler configured to branch the wavelength-division multiplex optical signal on the input side of the wavelength converter to the first wavelength filter and the second detector; and
- a second optical filter configured to adjust, in a succeeding stage of the second branch portion, power distribution with respect to a wavelength of each of the plurality of optical signals wavelength-multiplexed to the wavelength-division multiplex optical signal on the input side of the wavelength converter, wherein
- the controller controls an amount of adjustment of the power distribution of the second optical filter and the temperature of the wavelength converter such that the difference between the first ratio and the second ratio decreases.

8. A wavelength conversion method comprising:
- converting a wavelength band of a wavelength-division multiplex optical signal in which a plurality of optical signals is wavelength-multiplexed;
- transmitting the wavelength-division multiplex optical signal on an input side of the wavelength converter such that power distribution with respect to a wavelength of the plurality of optical signals is biased;
- transmitting the wavelength-division multiplex optical signal on an output side of the wavelength converter such that the power distribution with respect to the wavelength of the plurality of optical signals is biased;
- detecting first power of the wavelength-division multiplex optical signal which have been transmitted through the first wavelength filter on the input side of the wavelength converter;
- detecting second power of the wavelength-division multiplex optical signal which is not transmitted through the first wavelength filter on the input side of the wavelength converter;
- detecting third power of the wavelength-division multiplex optical signal which have been transmitted through the second wavelength filter on the output side of the wavelength converter;
- detecting fourth power of the wavelength-division multiplex optical signal which is not transmitted through the second wavelength filter on the output side of the wavelength converter; and
- controlling a temperature of the wavelength converter such that a difference between a first ratio of the second power to the first power and a second ratio of the fourth power to the third power decreases.

* * * * *